United States Patent
Gavrilov et al.

(10) Patent No.: US 8,504,593 B2
(45) Date of Patent: Aug. 6, 2013

(54) SERVER DIRECTORY SCHEMA COMPARATOR

(75) Inventors: Dmitri Gavrilov, Redmond, WA (US); Stephanie Cheung, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1191 days.

(21) Appl. No.: 11/771,424

(22) Filed: Jun. 29, 2007

(65) Prior Publication Data

US 2009/0006933 A1    Jan. 1, 2009

(51) Int. Cl.
*G06F 17/30* (2006.01)
(52) U.S. Cl.
USPC ............ 707/806; 707/638; 707/695; 707/821
(58) Field of Classification Search
USPC .................. 707/638, 695, 806, 821
See application file for complete search history.

(56) References Cited

U.S. PATENT DOCUMENTS

| | | | |
|---|---|---|---|
| 6,216,136 B1 | 4/2001 | Ronström | |
| 6,252,956 B1 | 6/2001 | Karino | |
| 6,540,142 B1 * | 4/2003 | Alleshouse | 235/462.01 |
| 6,615,223 B1 * | 9/2003 | Shih et al. | 707/625 |
| 6,871,346 B1 | 3/2005 | Kumbalimutt et al. | |
| 7,174,353 B2 | 2/2007 | Friske et al. | |
| 7,363,327 B2 * | 4/2008 | Bali et al. | 1/1 |
| 2004/0068523 A1 * | 4/2004 | Keith et al. | 707/200 |
| 2006/0136471 A1 * | 6/2006 | Ge et al. | 707/102 |
| 2008/0168109 A1 * | 7/2008 | Gaurav et al. | 707/203 |

FOREIGN PATENT DOCUMENTS

| | | |
|---|---|---|
| JP | 2001-14328 | 1/2001 |
| JP | 2002-032246 | 1/2002 |
| JP | 2002-373101 | 12/2002 |
| JP | 2005-092612 | 4/2005 |
| JP | 2008-223614 | 9/2008 |
| WO | 2009/005989 | 1/2009 |

OTHER PUBLICATIONS

International Search Report and Written Opinion for PCT Application No. PCT/US2008/066654 dated Dec. 23, 2008.
Chinese Notice on the Second Office Action mailed Jan. 12, 2012, in Application No. 200880022362.3 (6 pages).
Chinese Notice on Grant of Patent Right for Invention mailed Aug. 17, 2012, in Application No. 200880022362.3 (4 pages).
Ishi, Naoshi. "Structure of Server in SuiteSpot3.2, Appendix 1: Basis of Directory," OPENDESIGN, vol. 5, No. 5, pp. 92-97, CQ Publishing Co., Ltd, Japan, Oct. 1, 1998 (8 pages).
Japanese Notice of Rejection mailed on Dec. 7, 2012, in Application No. 2010-514949 (7 pages).

* cited by examiner

*Primary Examiner* — Hung Q Pham
(74) *Attorney, Agent, or Firm* — Merchant & Gould P.C.

(57) ABSTRACT

The embodiments generally relate to systems and methods for determining changes in a directory schema. In embodiments, directory changes are recorded in a change log. The change log may have one or more entries. A determination is made as to which change log entries should be retrieved. Once retrieved, the directory schema changes are determined. In embodiments, the directory changes are then interpreted for presentation to a user.

20 Claims, 7 Drawing Sheets

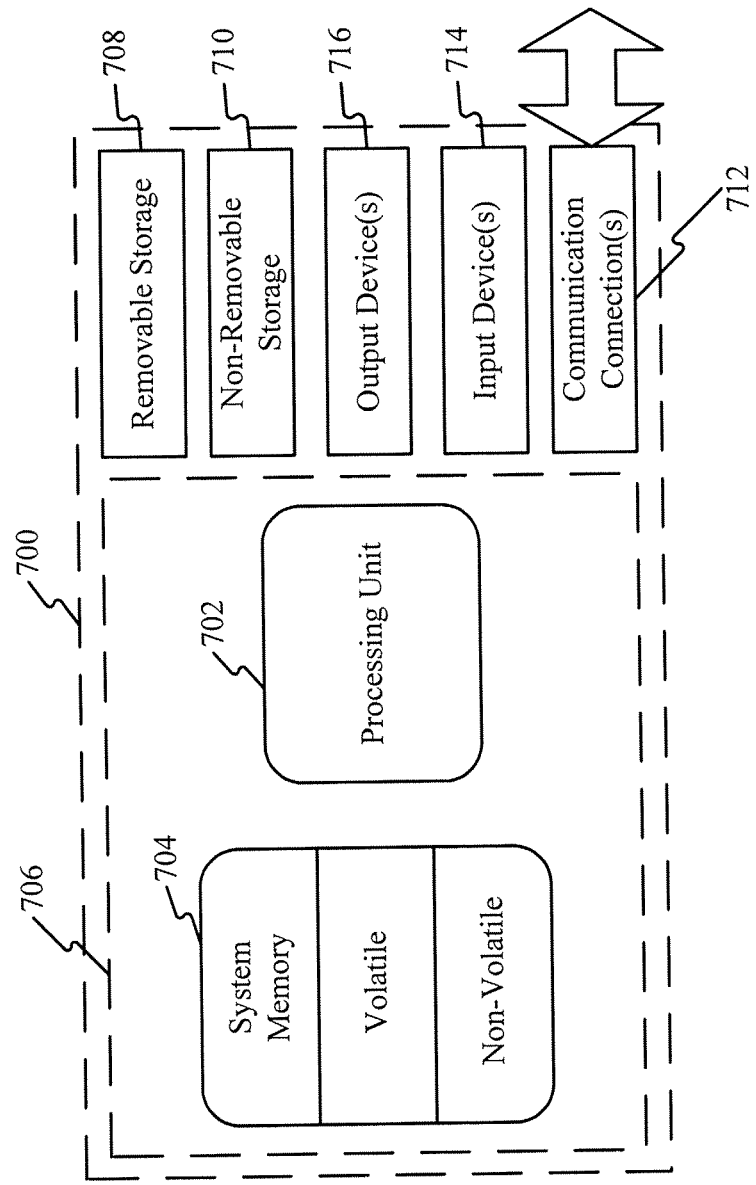

SERVER DIRECTORY SCHEMA COMPARATOR

BACKGROUND

Networks are generally configured as a group of servers, clients, and/or other systems. Data, software programs, and/or other information are stored on the network in a physical configuration. However, the information stored on the network is generally stored using a logical configuration referred to as a directory system, which may or may not have any relation to the physical configuration of the network. Directories are generally configured as a set of objects: users, computers, servers, domains, sites, folders, and/or files. The directory can have a predetermined or a specified schema. A schema defines how objects and their relations are represented on the directory and describes how the portions of the directory interact with each other. Generally, when an organization installs a directory the directory system creates or generates a standard schema. However, as users begin to modify the directory, by adding new software or by other actions, the schema changes.

Generally, changes to the directory schema cannot be undone or "rolled back." If a user does desire to undo a change, the user must often complete a forced recovery of one directory server, and possibly all of the directory servers, which is time-consuming and requires directory downtime. As such, users generally desire to know what changes have been made by third-party applications installed on the directory or by other actions to assess their risk as to possible problems. Unfortunately, there generally is no method or system that can provide a user with a clear picture as to what changes have been made to the directory schema.

SUMMARY

Embodiments of the present invention generally relate to systems and methods to determine changes to a directory schema. In embodiments, directory schema changes are recorded in a change log that can be later retrieved. Once retrieved, the directory schema changes are compared, in embodiments, to a baseline schema to determine all the changes to the directory schema that may presently exist. The schema changes may be interpreted, for example, in the context of Active Directory Domain Services or Active Directory Lightweight Directory Services, whichever applicable, for presentation to a user.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 7 is a block diagram of an embodiment of a computing system operable for determining differences in schema data.

DETAILED DESCRIPTION

This disclosure will now more fully describe some embodiments with reference to the accompanying drawings, in which only some of the possible embodiments are shown. Other aspects may be embodied in many different forms and should not be construed as limited to the embodiments set forth herein. Rather, these embodiments are provided so that this disclosure will convey the scope of the possible embodiments to those skilled in the art.

Embodiments of the present invention generally relate to new and improved systems and methods for determining changes to a directory schema. A schema is a data description of a directory system. For example, the schema defines all the objects and attributes that the directory service uses to store data. The physical structure of the schema may consist of the object definitions. The schema itself, in embodiments, is stored in the directory. In embodiments, directory schema changes are recorded and can be later retrieved. In one embodiment, two schemas compiled at different times and with different time stamps are compared. The differences are determined through the comparison. In another embodiment, a change log is recorded as changes are made to the directory schema. The changes in the change log are provided to the user for all changes after a predetermined point in time. The differences or schema changes may be interpreted for presentation to a user.

Figure 1:
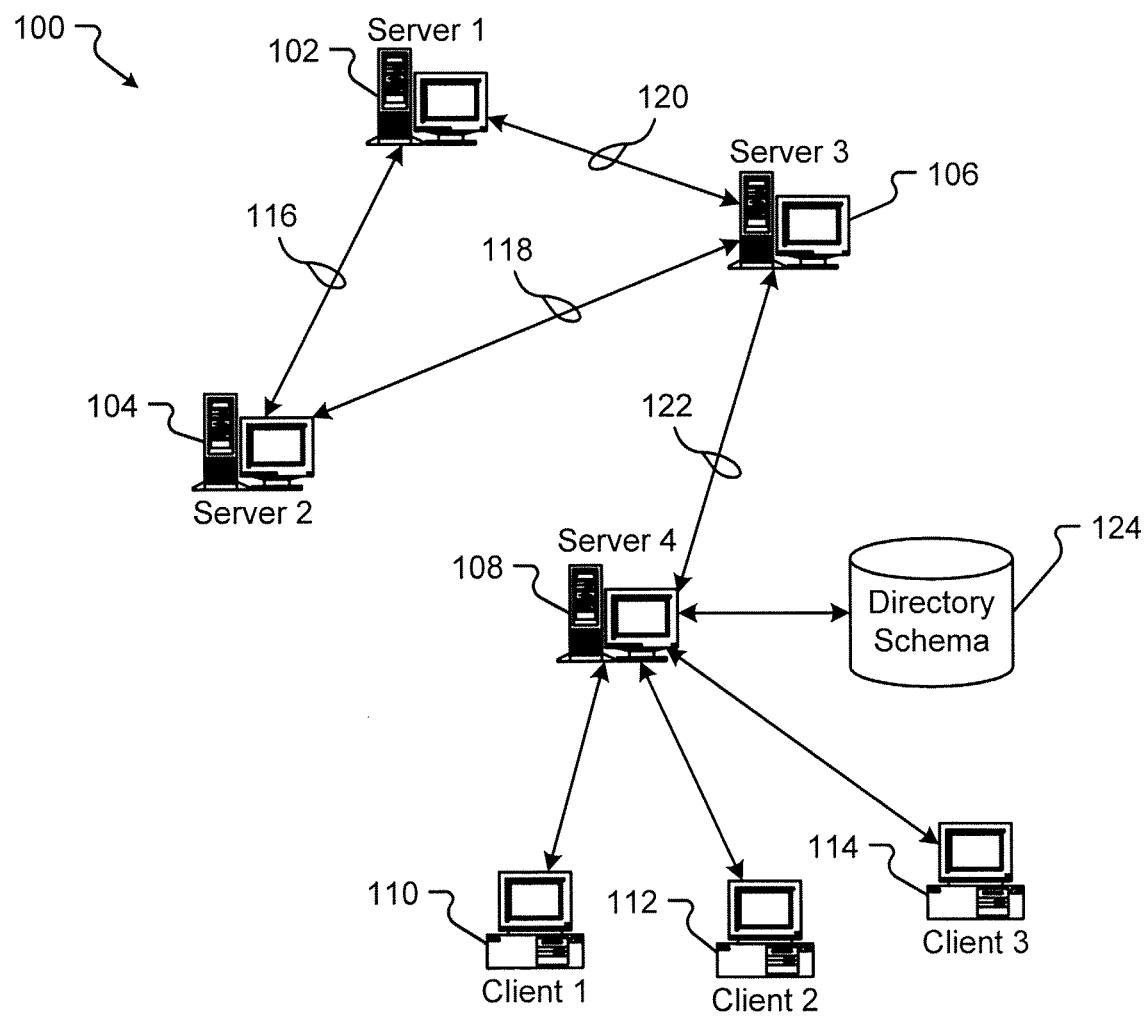
FIG. 1 is a block diagram of an embodiment of a server network, having a directory system described by a schema.

An embodiments of a server network 100 is shown in FIG. 1. A server network 100 may consist of two or more servers, such as Server 1 102, Server 2 104, Server 3 106, and Server 4 108. It should be noted that a server network may contain more or fewer servers or other components, for example, printers, other peripherals, routers, etc. Each server may have one or more client computer systems that communicate with the server. For example, Server 4 108 communicates with or interfaces with Client 1 110, Client 2 112, and Client 3 114. It should be noted that any one server may communicate with more or fewer clients than shown in FIG. 1.

The servers in the server network 100, in embodiments, are in communication with each other via various "connections," for example, connections 116, 118, 120, and 122. The term connected or connections is meant to embody any form of communication between two computer systems, which may include, but is not limited to, wireless communication, wired communication, communication over a network, an intranet, the Internet, etc. The communication may be by any protocol or in any form. Further, the server network 100 may consist of one or more domains or subsections.

The connections 116, 118, 120, and 122 and the configuration of the connections 116, 118, 120, and 122 defines the "schema" of the network. In embodiments, the schema is a definition or description of how the computing systems in the network are connected. In embodiments, the schema is a set of stored information at one or more of the servers. For example, the schema may be an LDAP database 124 stored at Server 4 108. The database 124 may be replicated to all servers such that each server has a copy of the schema locally at the server.

A server network 100 may interrelate or function to provide physical storage of data, programs, or provide other functions to clients throughout the network 100. In embodiments, how the data is stored logically is governed by a directory system, for example, Microsoft's® Active Directory Domain Services. A directory system may be any type of system that configures and organizes the logical portions of the directory. The directory system may be an object-oriented software system comprising one or more objects, each object may include one or more attributes.

In embodiments, a user, operating a client computer (e.g., Client 1 110), or a third-party software package installed in the directory system can change the schema or directory system. In embodiments, changes made by the user or third-party extensions to the directory system may add, modify, defunct, or remove: objects, object classes, or attributes. Users often need to understand the changes that have been made to the schema or directory system. Hereinafter, changes to the schema or directory system will be referred to simply as changes to the schema.

Figure 2:
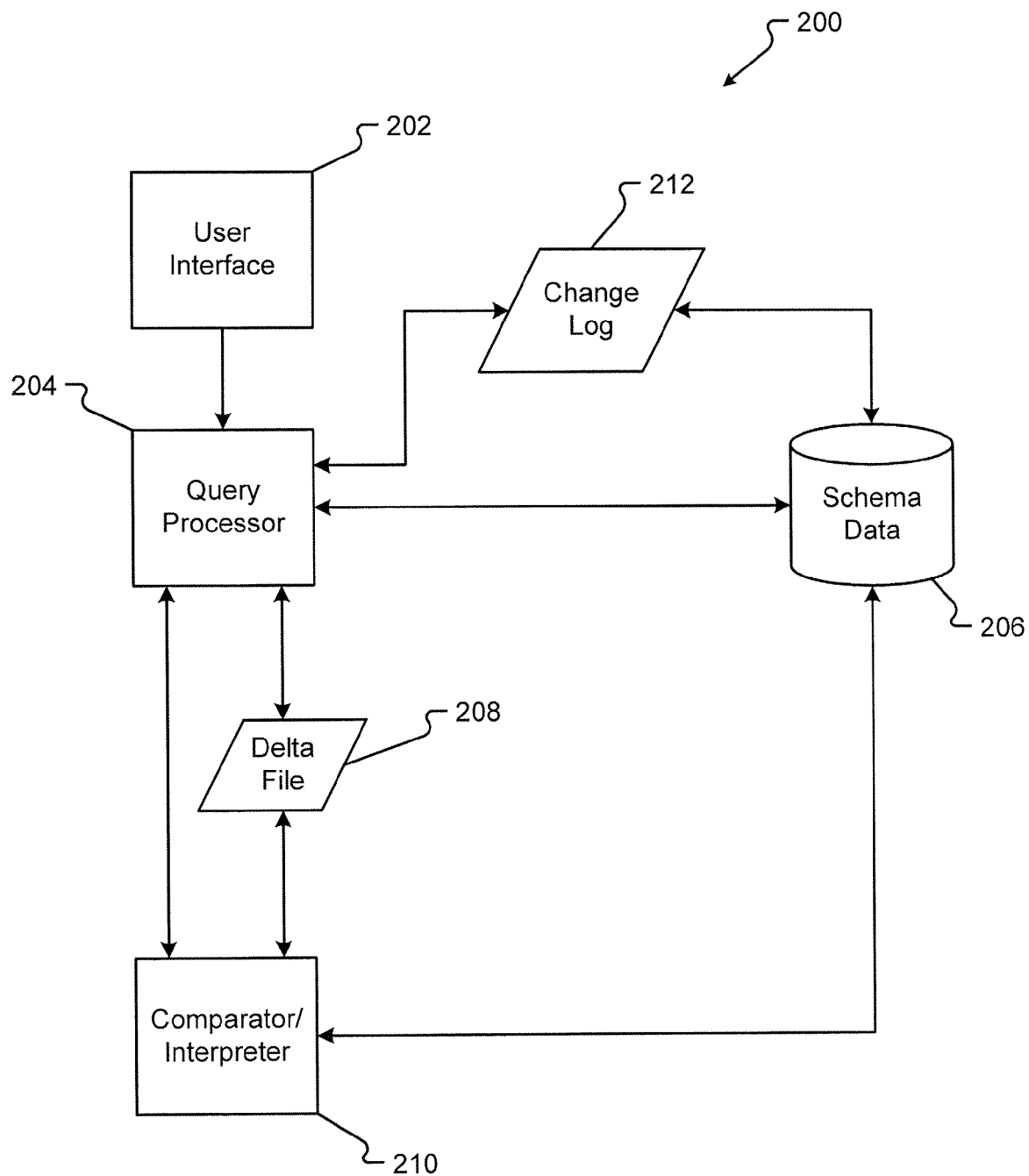
FIG. 2 is a block diagram of an embodiment of a system for determining changes to a schema.

An embodiment of a tool or system 200 to determine changes to the schema are shown in FIG. 2. The tool 200 may comprise, but is not limited to, a user interface 202, a query processor 204, and a comparator/interpreter 210. In embodiments, the tool 200 accesses a schema data datastore 206. The tool 200 may execute at a client, for example, Client 1 110 (FIG. 1), or at a server, for example, Server 4 108. The components of the tool 200, in embodiments, are software components or modules executable in a computer system. In alternative embodiments, the components of the tool 200 are hardware components or logic gates specially designed to execute the functions described herein.

The user interface 202, in embodiments, accepts user selections and provides output for display to the user. User selection devices, input devices, and output devices are described in conjunction with FIG. 7. The user interface 202 may receive requests or queries from the user regarding the changes that have been made to the schema. In still other embodiments, the user interface 202 provides an output displaying the changes that have been made to the schema. The user interface 202 is in communication with a query processor 204.

The query processor 204 receives and processors the user interface 202 selections. The query processor 204, in embodiments, receives the changes to the schema from a user. As the changes are generated, the query processor 204, in embodiments, logs the changes into a change log 212. In an alternative embodiment, the directory service logs the changes after receiving a request for a change at the query processor 204. The change log 212 can be any type of data element that records information about a change to the schema. In embodiments, the change log 212 comprises one or more discrete changes to the schema that occur during a predetermined period of time. The changes in the change log 212 may be time-stamped for later retrieval. In one embodiment, the change log 212 is sent to and stored in the schema data datastore 206.

The query processor 204 may also receive a request to determine changes that have been made to the schema. The query processor 204 can format a query and retrieve the required data to respond to the query. In one embodiment, the query processor 204 accesses the schema data datastore 206 to retrieve the appropriate data to respond to the query. In a further embodiment, the information retrieved from the schema data datastore 206 is sent to the comparator/interpreter 210, which generates a delta file 208. A delta file 208 can include one or more changes for the schema, which may be created by comparing a current schema and a standard to determine changes to the schema. The delta file 208, in other embodiments, comprises a standard schema and one or more change logs, e.g., 212. The delta file may include the schema, a pointer or reference to the schema, and/or changes to the schema. In still other embodiments, the delta file 208 comprises one or more change logs, e.g., 212, created from one point in time to another point in time.

The query processor 204, in embodiments, receives and formats the information from the schema data datastore 206 to provide to the user interface 202. In other embodiments, the query processor 204 communicates with a comparator/interpreter 210. The comparator/interpreter 210 can compare information from the schema data datastore 206 to determine the changes that have been made to the schema. In further embodiments, the comparator/interpreter 210 interprets the changes and formats the changes into a human-understandable form.

In one embodiment, the comparator/interpreter 210 receives the current schema and the standard schema. The comparator/interpreter 210 compares the current schema and the standard schema, noting all differences between the two schemas. In an alternative embodiment, the comparator/interpreter 210 determines all the changes listed in the one or more change logs. In still another embodiment, the comparator/interpreter 210 determines a schema at a certain, predetermined point in time. For example, the comparator/interpreter 210 establishes a standard schema with all changes made up to a predetermined point in time. This schema is then compared to a current schema to note differences between the schemas. In still another embodiment, the comparator/interpreter 210 determines all changes in one or more change logs created after a predetermined time. The determined changes may then be interpreted.

A change to the schema may be too abstract for a user. For example, the addition of an object class may not mean anything to a user in a tangible sense. The comparator/interpreter 210 interprets the changes for the user. For example, the creation of the new object class may be interpreted to mean that a certain new function can now be performed. The comparator/interpreter 210 can interpret other changes also to provide the user with cogent information. The comparator 210, for example, may present data in the context of the Active Directory Domain Services (AD DS) or the Active Directory Lightweight Directory Services (ADLDS).

In embodiments, a schema data datastore 206 provides schema data. In one embodiment, the schema data datastore 206 is located at a server, for example, Server 4 108 (FIG. 1). A client, for example, client 1 110 (FIG. 1), may access or request the schema data from the server. In other embodiments, the schema data datastore 206 is local at the client. The schema data datastore 206 may receive and process requests for schema data. For example, if a query processor 204 requests schema data for schemas created after a provided time, the schema data datastore 206 can determine and provide a schema created after the provided time. In alternative embodiments, the change log(s) 212 is stored at the schema data datastore 206. A request for schema data may require the schema data datastore 206 to provide one or more change logs 212 to the query processor 204 in the delta file 208.

Figure 3:
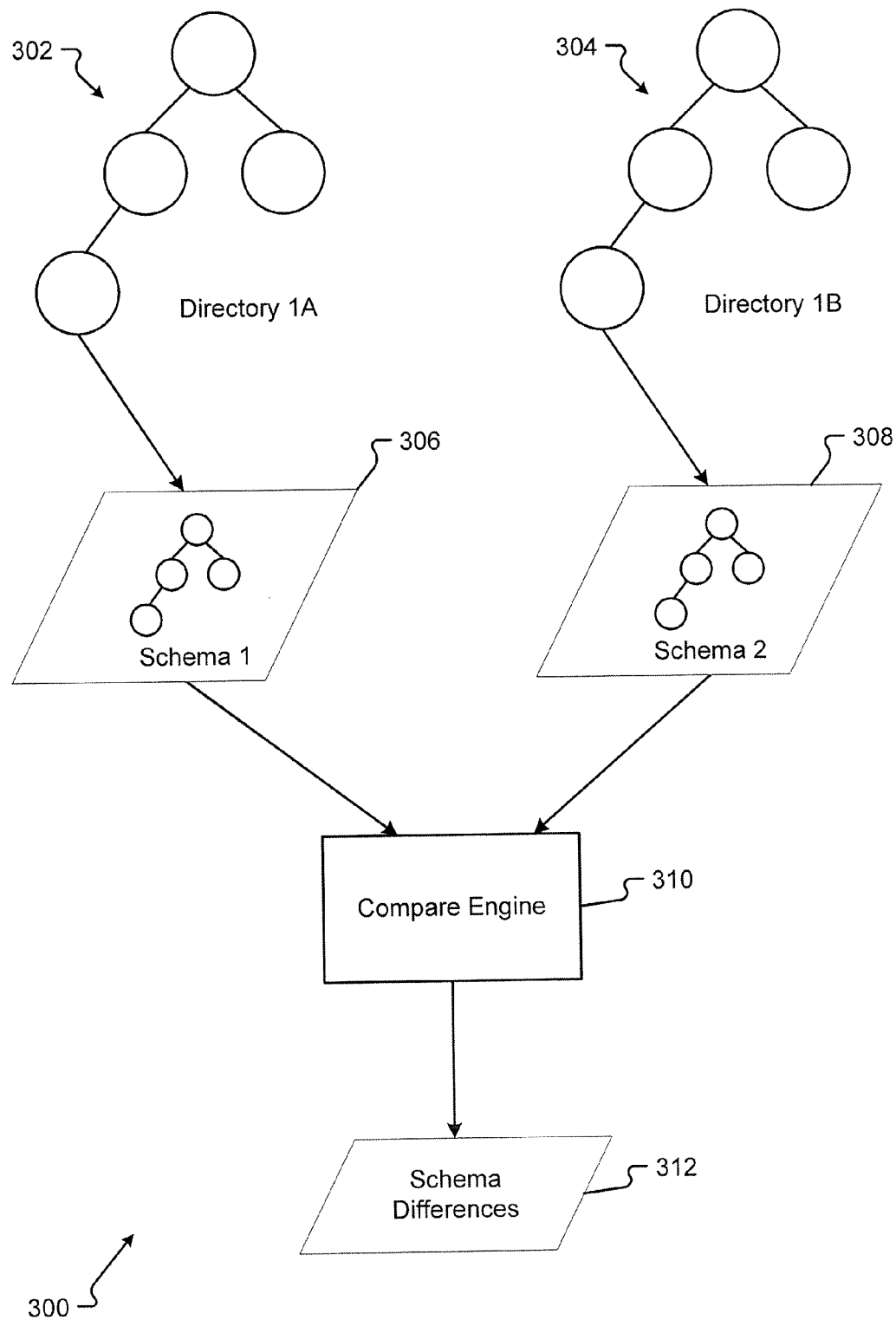
FIG. 3 is a block diagram of an embodiment of a method for comparing schema data.

A block diagram showing a process 300 for how schema differences are determined is shown in FIG. 3. A first directory, Directory 1A 302, is represented by a first schema, Schema 1 306. Directory 1A may be a directory as it was configured and as it operated at some predetermined point in time in the past. For example, Directory 1A may be the standard directory, that is, the directory schema that was configured with the initial installation of the directory system. The standard directory schema may be determined by the provider of the directory system. In other embodiments, Directory 1A 302 is the standard directory schema with some additional changes that occurred up to another point in time in the past.

A second directory, Directory 1B 304, is represent by a second schema, Schema 2 308. Directory 1B 304 may be a current directory. In other words, Schema 2 308 represents Directory 1B 304 as it currently exists. In other embodiments, Directory 1B 304 may be a directory as it existed at some point in the past but at some point after Directory 1A was created. Thus, the process 300 can determine changes to the schemas at two distinct points in time. In still another embodiment, Schema 2 308 is one or more change logs describing differences between Directory 1A 306 and Directory 1B 308.

A compare engine 310 receives Schema 1 306 and Schema 2 308 and determines the differences between the schemas. In one embodiment, the compare engine 310 parses the schemas and compares separate portions of the schemas to locate differences. For example, the compare engine 310 reviews Schema 2 308 for any attribute that is not in Schema 1 306. In other embodiments, the compare engine 310 determines a time stamp for Schema 1 306 and a time stamp for Schema 2 308. The compare engine 310 then locates any change logs with a time stamp after the time stamp for Schema 1 306 but before or up to the time stamp for Schema 2 308. The schema differences 312 are output from the compare engine 310.

Figure 4:
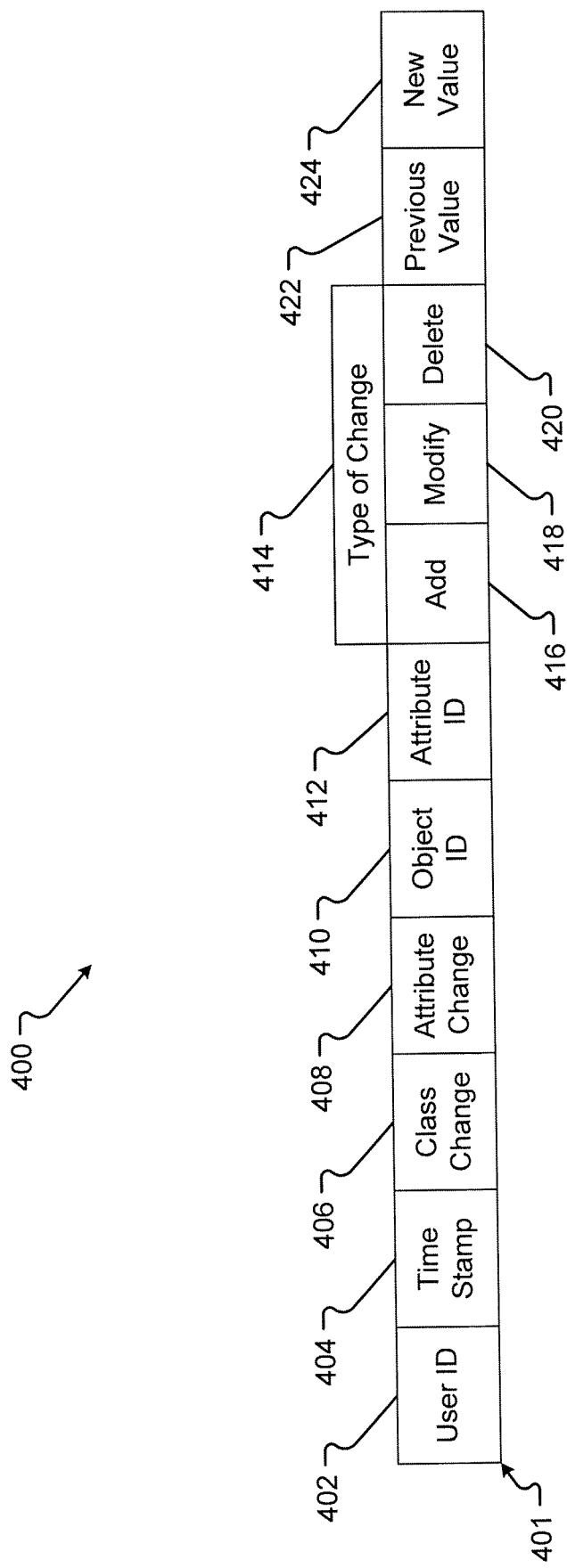
FIG. 4 is a data structure diagram of an embodiment of a data structure for recording changes to a schema.

An embodiment of a data structure 400 that can contain change log information is shown in FIG. 4. In embodiments, a change log 400 may include one or more change log data entries 401. The change log data entry 401, in embodiments, may comprise, but is not limited to, a user identification (ID) 402, a time stamp 404, a class change indicator 406, an attribute change indicator 408, an object ID 410, and attribute ID 412, a field indicating the type of change 414, a previous value field 422, and a new value field 424. A computer system, for example, Server 4 108 or Client 1 110, may use the information in the change log 400 to determine changes to the schema. For example, the change log 400 is stored in an LDAP database, for example, datastore 124.

In embodiments, when a user starts a session to change the schema, the user logs into the computer system using an ID. This user ID is stored into the change log entry 401 in field 402. The user ID 402 allows the system 200 (FIG. 2) to provide information about which user made a change to the schema. The time stamp 404, in embodiments, stores the current time when a change is made to the schema. The time stamp 404 can be used to compare changes and determine which changes were made after some predetermined time in the past.

Changes to the schema may be to an object class or an attribute. In other embodiments, one or more other types of changes are made to the schema. To identify what type of change has been made, a class change indicator field 406, in embodiments, indicates that a change has been made to an object or an object class. The attribute change indicator field 408 can indicate that a change was to an attribute of one or more objects. One or more other fields may be included that could indicate other types of changes, although these other fields are not shown to simplify the explanation of the embodiments. The comparator/interpreter 210 (FIG. 2) can interpret the data in the class change field 406 or the attribute change field 408 to provide the user with an explanation of what the change has done to the schema.

To identify the specific object or attribute that has been changed, the change log entry 401, in embodiments, includes an object ID 410 or an attribute ID 412. The object ID 410 identifies the object or object class that has changed. The object ID 410 may be a Globally Unique Identifier (GUID) or other appropriate ID. The attribute ID 412 may also be a GUID or other appropriate ID. One or more other identifiers may be included in the change log entry 401 depending on if there are other types changes that could be made to the schema, as explained with the class change field 408. The comparator/interpreter 210 (FIG. 2) can interpret the data in the object ID field 410 or the attribute ID field 412 to provide the user with an explanation of what the change has done to the schema. For example, if the object identified by the object ID 410 allowed a server to replicate (replication is the process where servers copy shared data between each server) only once a day, a change to the object could indicate that the server may be able to replicate more than once a day. To determine which type of change was made, the comparator/interpreter 210 (FIG. 2) may inspect the type of change field 414.

In embodiments, the type of change field 414 contains one or more indicators as to the type of change made to the object or attribute. The type of change field 414, in embodiments, may include, but is not limited to, an add field 416, a modify field 418, and/or a defunct/delete field 420. The add field 416 may indicate that an object or an attribute has been added to the schema. The modify field 418 may indicate that the value of the object or attribute has been changed. Finally, the defunct/delete field 420 may indicate that the object or attribute has been disabled/deleted. The comparator/interpreter 210 (FIG. 2) can interpret the data in the type of change field 414 to indicate to the user what was done to the schema. If the modify field 418 is set, the comparator/interpreter 210 may try to determine what change was made by interpreting the previous value field 422 and/or the new value field 424.

A previous value field 422, in embodiments, indicates the value of an object or attribute before a modification. The new value field 424 may indicate the new value of an object or attribute after a modification. In another embodiment, the new value field 424 indicates the value of a new object or attribute that was added as indicated by the add field 416 being set. The comparator/interpreter 210 (FIG. 2) can use the previous value field 422 and the new value field 424 to explain how the change affected the schema. For example, the object identified by the object ID 410 may be a parent object with one child object, as indicated by a value of "1" in the previous value field 422. The change may add a second child object as indicated by a "2" in the new value field 424. The comparator/interpreter 210 can use the data in the change log 400 and any metadata associated with the objects in the schema to explain changes to the user.

Figure 5:
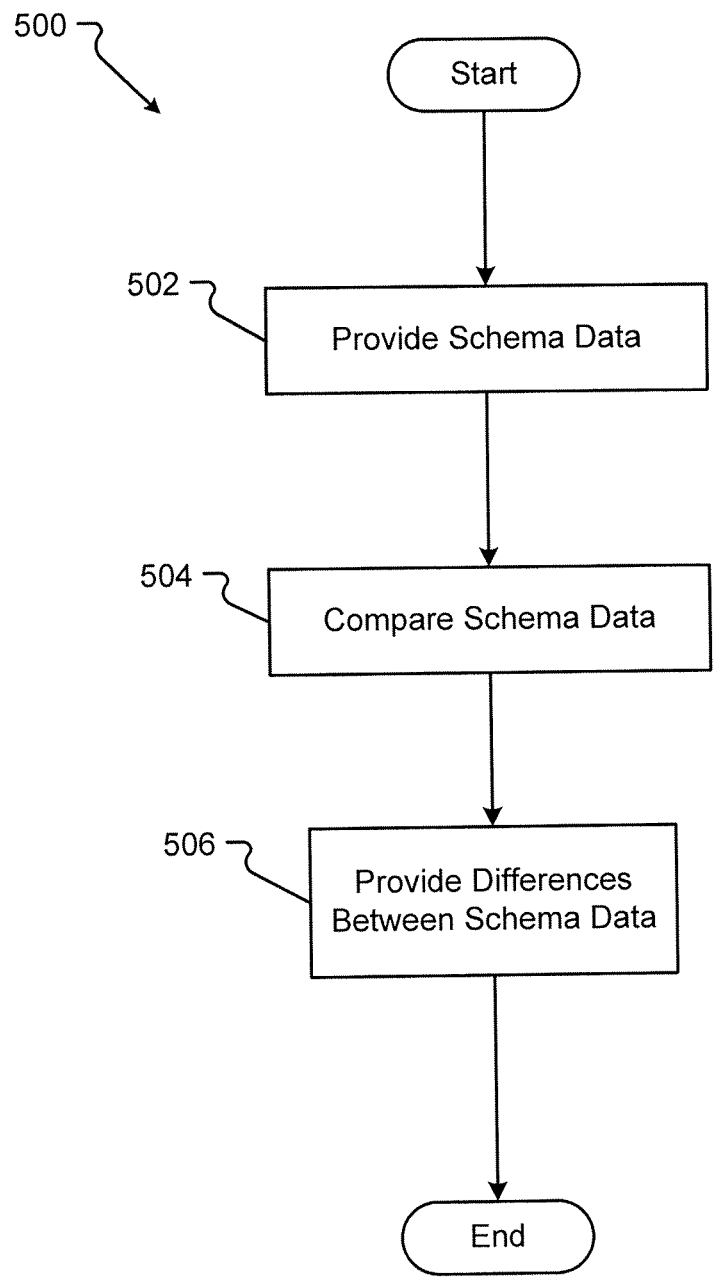
FIG. 5 is a flow diagram of an embodiment of a process for determining differences found in schema data.

An embodiment of a method 500 for providing differences between two schemas is shown in FIG. 5. In embodiments, the method 500 is a set of computer instructions executed in a computer system. The method 500 generally starts with a "Start" operation and ends with an "End" operation.

Provide operation 502 provides schema data. In one embodiment, a system 200 (FIG. 2) retrieves schema data 306 (FIG. 3) for a first directory 302 (FIG. 3) that existed at a first time, indicated by a time stamp 404 (FIG. 4). In an alternative embodiment, the first directory 302 (FIG. 3) may be a standard directory and have no time stamp. The system 200 (FIG. 2) may also retrieve schema data 308 (FIG. 3) for a second directory 304 (FIG. 3) that existed at a second time, indicated by a time stamp 404 (FIG. 4). In an alternative embodiment, the system 200 (FIG. 2) may determine the first time stamp 404 (FIG. 4) for a first directory that existed at a first time. Then, the system 200 (FIG. 2) locates change log entries 401 with a time stamp 404 (FIG. 4) that are after the first time stamp.

Compare operation 504 compares the schema data. In one embodiment, a comparator/interpreter 210 (FIG. 2) compares the first directory schema 306 (FIG. 3) to the second schema directory 308 (FIG. 3). The comparator/interpreter 210 (FIG. 2) can parse the second directory schema 308 (FIG. 3) and then determine if the same objects, using the object ID 410 (FIG. 4), exist in the first directory schema 306 (FIG. 3). Similarly, the comparator/interpreter 210 (FIG. 2) can discover attribute differences using the attribute field, or, in other embodiments, the attribute ID 412 (FIG. 4). In an alternative embodiment, the comparator/interpreter 210 (FIG. 2) compiles the change log entries 401 (FIG. 4) with a later time stamp 404 (FIG. 4) than the time stamp of the first directory schema 306 (FIG. 3).

Provide operation 506 provides the differences between the schema data. In an embodiment, the comparator/interpreter 210 (FIG. 2) interprets the differences. For example, the change log 400 (FIG. 4) may be aggregated and each change log entry 401 (FIG. 4) interpreted. The comparator/interpreter 210 (FIG. 2), for example, uses the object ID 410 (FIG. 4), type of change field 414 (FIG. 4), and possibly both the previous value field 422 (FIG. 4) and the new value field 424 (FIG. 4) to determine the type of change. The change is described in human-understandable language and sent to a user interface 202 (FIG. 2) for display to the user.

Figure 6:
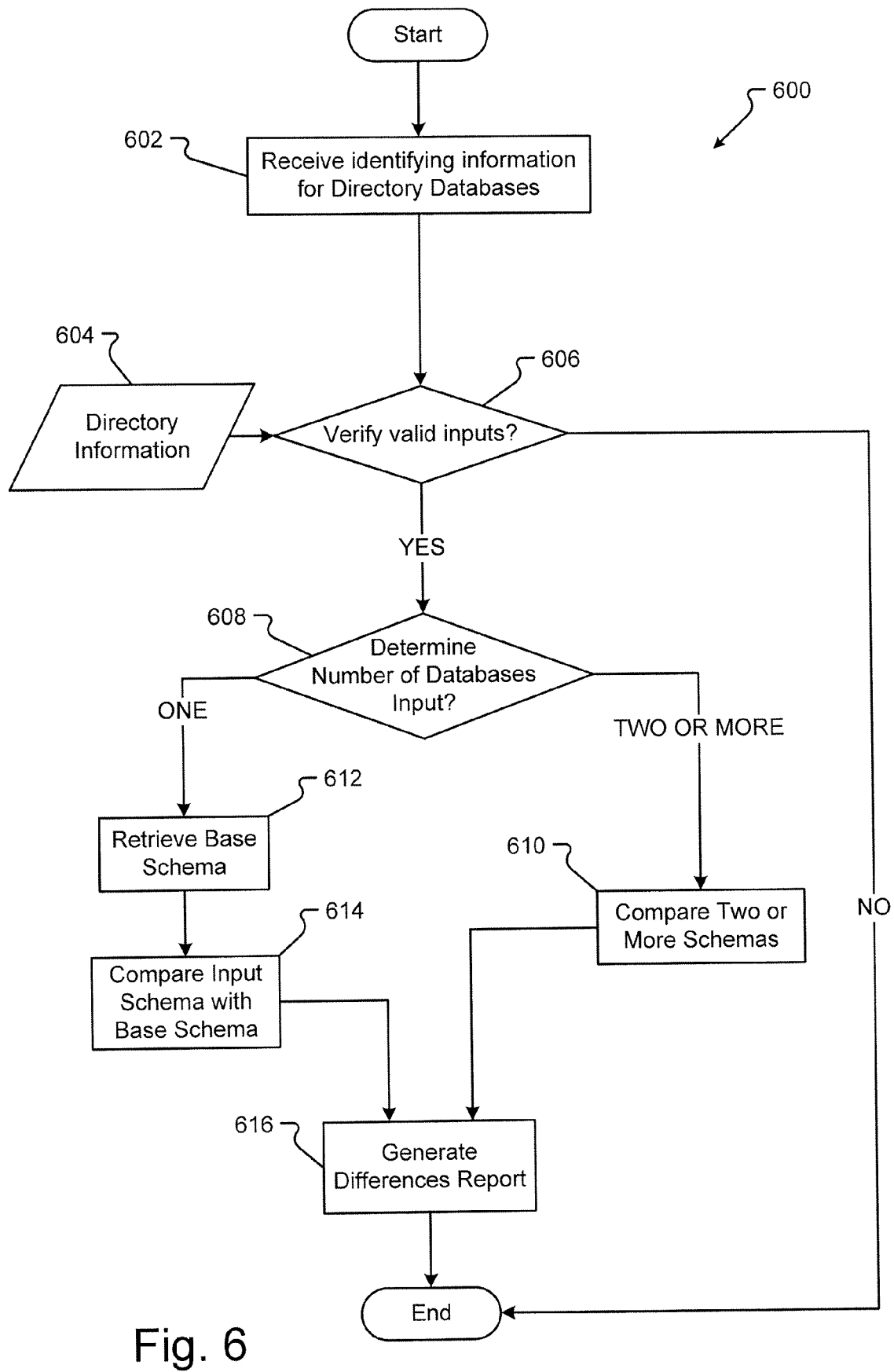
FIG. 6 is a flow diagram of an embodiment of a process for comparing schema data.

Another embodiment of a method 600 for determining differences in directory schemas is shown in FIG. 6. In embodiments, the method 600 is a set of computer instructions executed in a computer system. The method 600 generally starts with a "Start" operation and ends with an "End" operation. Receive operation 602 receives information for directory databases, for example, Microsoft® Active Directory Domain Services. In an embodiment, a user enters information associated with two directory databases in the user interface 202 (FIG. 2). For example, the user may enter a first time for the first directory schema 306 (FIG. 3) and a second time for a second directory schema 308 (FIG. 3). In other embodiments, the user enters only a second directory schema 308 (FIG. 3), in which situation, the system 200 (FIG. 2) uses a standard directory schema as the first directory schema.

Verify operation 606 verifies if the inputs are valid. In an embodiment, the query processor 204 (FIG. 2) determines if there is a directory schema associated with the information received. For example, the query processor 204 (FIG. 2) determines if there is a directory schema with a time stamp after the time stamp received. If the inputs are not valid, the process flows NO to produce an error to the user and end. If the inputs are valid, the directory information 604 is retrieved, as from directory schema database 206 (FIG. 2). Directory information 604 may include a schema 308 (FIG. 3) and/or a change log 212 (FIG. 2). The process then flows YES to determine operation 608.

Determine operation 608 determines the number of database inputs. In one embodiment, the query processor 204 (FIG. 2) determines if the user input one schema or two. If one schema was input, the process flows ONE to retrieve operation 612. If two or more schemas were input, the process flows TWO OR MORE to compare operation 610. Retrieve operation 612 retrieves a base schema. In embodiments, the query processor 204 (FIG. 2) retrieves the base or standard schema from the schema datastore 206 (FIG. 2).

Compare operation 614 compares the input schema with the base schema. In embodiments, the query processor 204 (FIG. 2) provides the base schema and the input schema to the comparator/interpreter 210 (FIG. 2). The comparator/interpreter 210 (FIG. 2) compares the schemas. In one embodiment, the comparator/interpreter 210 (FIG. 2) parses and compares the schemas as explained in conjunction with FIG. 5. In another embodiment, the comparator/interpreter 210 (FIG. 2) determines the changes from the change log 400 (FIG. 4) as explained in conjunction with FIG. 5.

Compare operation 610 compares the two schemas input by the user. In an embodiment, the query processor 204 (FIG. 2) provides the two input schemas to the comparator/interpreter 210 (FIG. 2), which compares the schemas. The comparator/interpreter 210 (FIG. 2) then compares the schemas as described in conjunction with FIG. 5.

Generate operation 616 generates a report of the differences. The comparator/interpreter 210 (FIG. 2), in an embodiment, provides the interpreted schema differences to the query processor 204 (FIG. 2). The query processor 204 (FIG. 2) creates a report to answer the user's query and displays the report on the user interface 202 (FIG. 2). In an embodiment, the user views the report in a text-based format.

With reference to FIG. 7, an embodiment of a computing environment for implementing the embodiments described herein is shown. In one embodiment, the system 200 (FIG. 2) is a software application executed at a client machine. In alternative embodiments, the system 200 (FIG. 2) is a server, desktop, laptop, handheld device, or other computing system executing software for the client. Embodiments of the computer environment for the system 200 (FIG. 2) include a computer system, such as computer system 700.

In its most basic configuration, computer system 700 typically includes at least one processing unit 702 and system memory 704. In embodiments, the tool 200 (FIG. 2) is loaded into and run by the processing unit 702 from system memory 704 of a computer. Depending on the exact configuration and type of computer system 700, memory 704 may be volatile (such as RAM), non-volatile (such as ROM, flash memory, etc.), or some combination of the two. This most basic configuration of the computer system 700 is illustrated in FIG. 7 by dashed line 706.

Additionally, device 700 may also have additional features/functionality. For example, device 700 includes additional storage (removable and/or non-removable) including, but not limited to, magnetic, optical disks or tape. Such additional storage is illustrated in FIG. 7 by removable storage 708 and non-removable storage 710. In embodiments, the tool 200 (FIG. 2), or other components described herein, are stored in non-removable storage 710, although the software components to be installed or data may be saved into removable storage 708, and loaded into system memory 704 for use by or for execution by the processing unit 702 on the computer. In some embodiments, the tool 200 (FIG. 2), the change logs 400 (FIG. 4), or other software components described herein, are one of several components of a software system 200 (FIG. 2). Computer storage media includes volatile and nonvolatile, removable and non-removable media implemented in any method or technology for storage of information such as computer readable instructions, data structures, program modules, or other data.

Memory 704, removable storage 708, and non-removable storage 710 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage, other magnetic storage devices, or any other medium which is used to store the desired information, for example, the change log 400 (FIG. 4), and which is accessed by device 700 and processor 702 on the client computer or the server computer. Any such computer storage media may be part of device 700. In embodiments, the change log 400 (FIG. 4) may be stored locally at the client computer. In other embodiments, the change log 400 (FIG. 4) may be stored at a server. For example, in Active Directory databases, one server functions in the role as schema master. This server may store the change log 400 (FIG. 4) and transfer the change log 400 (FIG. 4) to another server if the other server assumes the schema master role.

Device 700 may also contain communications connection(s) 712 that allow the device to communicate with other devices. In embodiments, the communication connections 712 are used to send and/or receive data, for example, the change log 400 (FIG. 4), over a network, such as the Internet. Communications connection(s) 712 is an example of communication media.

In embodiments, device 700 includes a graphical user interface that includes input devices 714 and output devices 716. Data selections for the schemas through the user interface 202 (FIG. 2), in embodiments, are selected with user input device(s) 714, and the data are displayed with output device(s) 716. Input device(s) 714 are also referred to as user interface selection devices and include, but are not limited to, a keyboard, a mouse, a pen, a voice input device, a touch input device, etc. Output device(s) 716 are also referred to as displays and include, but are not limited to, cathode ray tube displays, plasma screen displays, liquid crystal screen displays, speakers, printers, etc. These devices, either individually or in combination, form the graphical user interface 202 (FIG. 2) used to display schema data as described herein. All these devices are well known in the art and need not be discussed at length here.

Computer system 700 typically includes at least some form of computer readable media. Computer readable media can be any available media that can be accessed by processing unit 702. By way of example, and not limitation, computer readable media comprise computer storage media. Software system 200 (FIG. 2) and the components, methods, and/or algorithms described herein comprise such modules or instructions executable by computer system 700 that may be stored on computer storage medium. Computer storage media includes volatile and nonvolatile, removable and non-removable media implemented in any method or technology for storage of information such as computer readable instructions, data structures, program modules, or other data. Combinations of the any of the above should also be included within the scope of computer readable media.

Although the embodiments have been described in language specific to structural features, methodological acts, and computer-readable media containing such acts, it is to be understood that the possible embodiments, as defined in the appended claims, are not necessarily limited to the specific structure, acts, or media described. One skilled in the art will recognize other embodiments or improvements that are within the scope and spirit of the present invention. Therefore, the specific structure, acts, or media are disclosed only as illustrative embodiments. The invention is defined by the appended claims.

What is claimed is:

1. A method executable in a computer system for determining changes to a directory schema of a directory, the method comprising:
receiving, by the computer system, a first selection of a first version of a directory schema;
determining, by the computer system, one or more changes between the first version of the directory schema and a second version of the directory schema, wherein the determined one or more changes between the first version of the directory schema and the second version of the directory schema comprise one or more modifications to how one or more objects and their relations are represented on the directory;
interpreting, by the computer system, the determined one or more changes into a human understandable format, wherein the human understandable format provides an interpretation interpreting the determined one or more changes into one or more new functions that are performed as a result of the determined one or more changes;
providing, by the computer system, to a user interface, the interpreted one or more changes in the human understandable format.

2. The method as defined in claim 1, further comprising comparing the first version of the directory schema to the second version of the directory schema.

3. The method as defined in claim 1, wherein the first version of the directory schema is created at a first time and the second version of the directory schema is created at a second time.

4. The method as defined in claim 1, wherein the second version of the directory schema is a standard schema.

5. The method as defined in claim 1, wherein the first version of the directory schema comprises a change log for at least one changes made after the second version of the directory schema was created.

6. The method as defined in claim 1, further comprising:
receiving a second selection of the second version of the directory schema;
verifying that the first selection and the second selection are valid;
if the first selection and the second selection are not valid, providing an error; and
if the first selection and the second selection are valid, determining one or more changes between the first version of the directory schema and the second version of the directory schema.

7. The method as defined in claim 1, further comprising:
determining if more than the first selection was received;
if only the first selection was received, retrieving a standard schema;
if only the first selection was received, comparing the standard schema to the first version of the directory schema;
if more than the first selection was received, receiving at least a second selection of a second version of the directory schema; and
if more than the first selection was received, comparing the first version of the directory schema to at least the second version of the directory schema.

8. The method as defined in claim 1, further comprising generating a differences report.

9. A computer storage medium embedded with computer instructions for determining changes to a directory schema of a directory, the embedded computer instructions executed by a computer system to perform steps comprising:
receiving a first selection of a first version of a directory schema;
determining one or more changes between the first version of the directory schema and a second version of the directory schema, wherein the determined one or more changes between the first version of the directory schema and the second version of the directory schema comprise one or more modifications to how one or more objects and their relations are represented on the directory;
interpreting the determined one or more changes into a human understandable format, wherein the human understandable format provides an interpretation interpreting the determined one or more changes into one or more new functions that are performed as a result of the determined one or more changes;

providing to a user interface, the interpreted one or more changes in the human understandable format.

10. The computer storage medium as defined in claim 9, further comprising embedded computer instructions executed by the computer system for comparing the first version of the directory schema to the second version of the directory schema.

11. The computer storage medium as defined in claim 9, wherein the first version of the directory schema is created at a first time and the second version of the directory schema is created at a second time.

12. The computer storage medium as defined in claim 11, wherein the second version of the directory schema is a standard schema.

13. The computer storage medium as defined in claim 12, wherein the first version of the directory schema comprises a change log for at least one changes made after the second version of the directory schema was created.

14. The computer storage medium as defined in claim 9, further comprising embedded computer instructions executed by the computer system for:

receiving a second selection of the second version of the directory schema;

verifying that the first selection and the second selection are valid;

if the first selection and the second selection are not valid, providing an error; and if the first selection and the second selection are valid, determining one or more changes between the first version of the directory schema and the second version of the directory schema.

15. A computer system for determining changes to a directory schema of a directory, the system comprising:

a processor; and a memory communicatively coupled to the processor, the memory having computer-executable instructions that when executed by the processor, provide a method for:

receiving a first selection of a first version of a directory schema;

determining one or more changes between the first version of the directory schema and a second version of the directory schema, wherein the determined one or more changes between the first version of the directory schema and the second version of the directory schema comprise one or more modifications to how one or more objects and their relations are represented on the directory;

interpreting the determined one or more changes into a human understandable format, wherein the human understandable format provides an interpretation interpreting the one or more changes into one or more new functions that may be performed as a result of the determined one more changes; and providing, to a user interface, the interpreted one or more changes in the human understandable format.

16. The computer system as defined in claim 15, further comprising comparing the first version of the directory schema to the second version of the directory schema.

17. The computer system as defined in claim 15, wherein the first version of the directory schema is created at a first time and the second version of the directory schema is created at a second time.

18. The computer system as defined in claim 15, wherein the second version of the directory schema is a standard schema.

19. The computer system as defined in claim 15, wherein the first version of the directory schema comprises a change log for at least one changes made after the second version of the directory schema was created.

20. The computer system as defined in claim 15, further comprising:

receiving a second selection of the second version of the directory schema;

verifying that the first selection and the second selection are valid; if the first selection and the second selection are not valid, providing an error; and if the first selection and the second selection are valid, determining one or more changes between the first version of the directory schema and the second version of the directory schema.

* * * * *